INVENTORS
THEODORE W. MARSHALL
FREDERICK W. RANKIN
NORMAN E. WILLETT

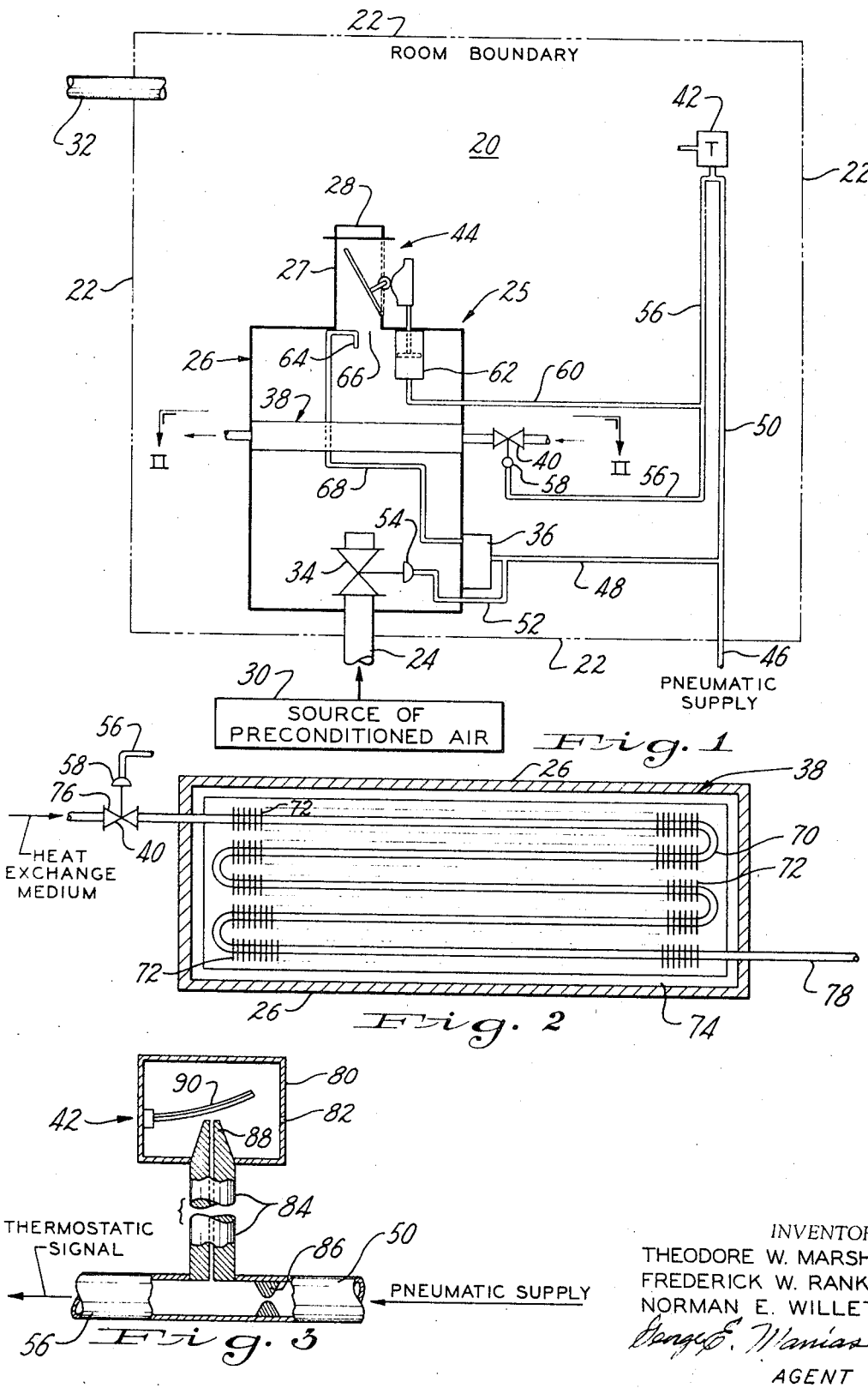

AGENT

INVENTORS
THEODORE W. MARSHALL
FREDERICK W. RANKIN
NORMAN E. WILLET

AGENT

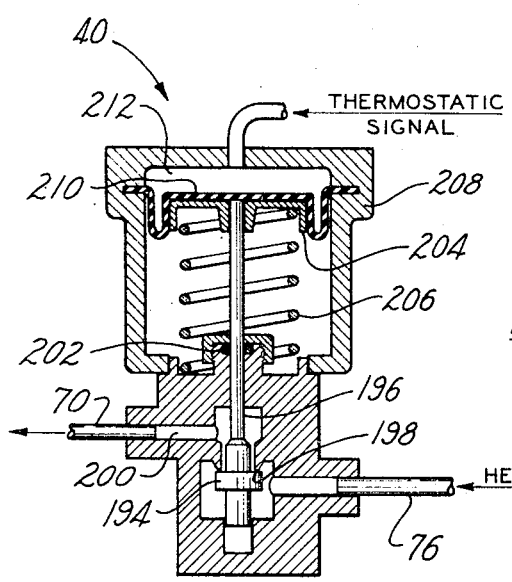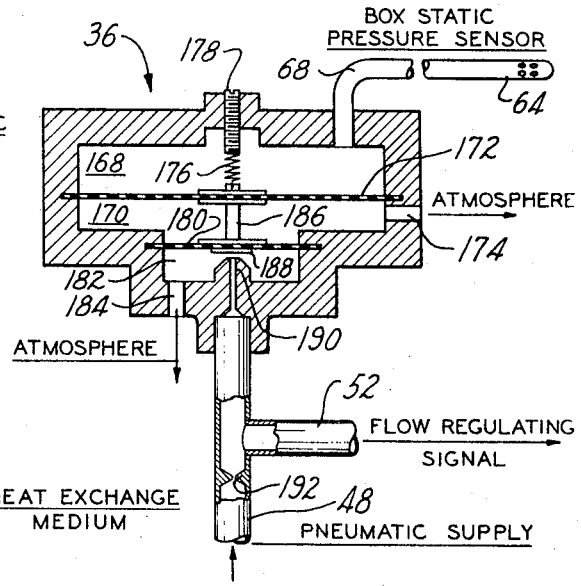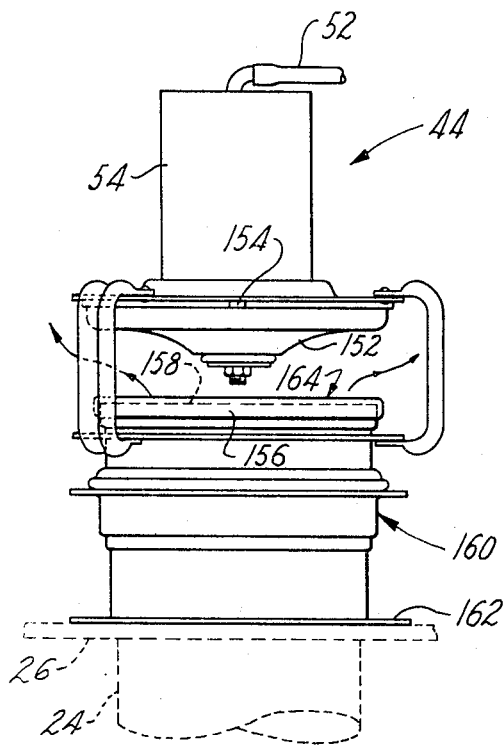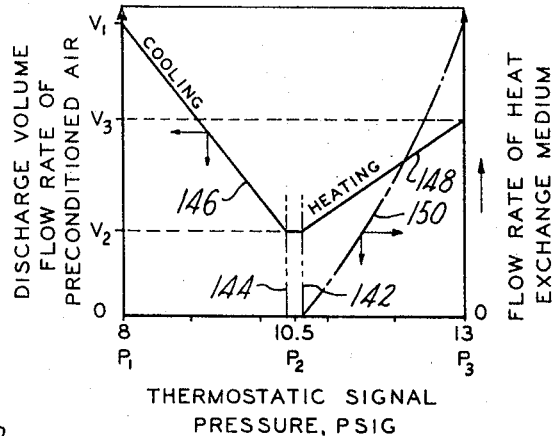

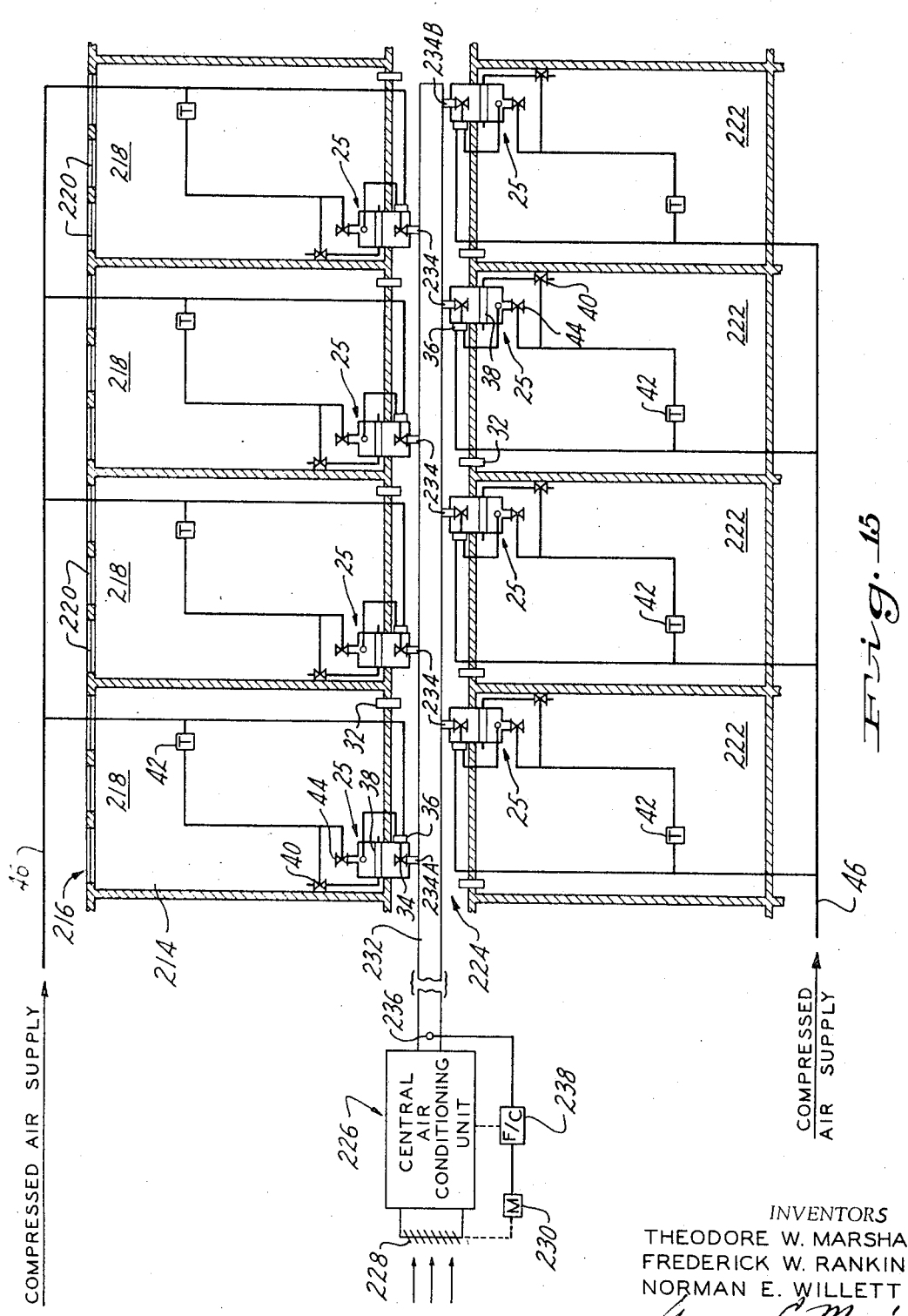

3,445,317
AIR CONDITIONING APPARATUS
Theodore W. Marshall, Frederick W. Rankin, and Norman E. Willett, Connersville, Ind., assignors to H. H. Robertson Company, Pittsburgh, Pa., a corporation of Pennsylvania
Filed Sept. 21, 1967, Ser. No. 669,448
Int. Cl. F24f 3/06, 11/08, 13/10
U.S. Cl. 165—39                 6 Claims

ABSTRACT OF THE DISCLOSURE

An air conditioning device for conditioning air in each individual room of a building requiring heating and cooling. A single stream of preconditioned air is conveyed to the device wherein the volume flow rate and/or temperature thereof are regulated in accordance with the existing conditions in the individual rooms to maintain the air temperature in the rooms at a selected temperature. The conditioned air is discharged from the apparatus at a constant velocity regardless of variations in volume flow rate and/or temperature of the conditioned air.

BACKGROUND OF THE INVENTION

Field of the invention

This invention relates to air conditioning apparatus, and more particularly to air conditioning apparatus for the automatic regulation of room temperature by regulation of volume flow rate and/or temperature of a single stream of preconditioned air which is discharged into said room at a substantially constant velocity.

Description of the prior art

Air distributing apparatus of the type discharging conditioned air at a constant velocity to achieve control of room atmosphere is described in the prior art. See for example U.S. Patents 2,977,870 and 3,009,408. Such apparatus comprises large bulky equipment situated in or near the room to be conditioned and includes a complex system of louvers and louver operating mechanisms. Furthermore, it is essential to the operation of the prior system that the discharge grill be positioned at a specific location in the room to achieve the purposes of the invention.

Air distributing apparatus of the type wherein conditioned air is discharged at a constant velocity while the volume flow rate of the discharged air is varied to achieve control of room temperature are also described in the prior art. See for example U.S. Patents 2,281,615 and 2,660,946. Such apparatus has several disadvantages. For example, the apparatus receives a single stream of conditioned air whose temperature is changed from hot to cold and from cold to hot to accomplish conditioning of the room air during summer and winter.

This prior art system depends on constant static pressure in the header duct to obtain a constant discharge velocity for the conditioned air introduced into each room. Because of friction losses in the header duct, for example, maintaining a constant discharge velocity in each room serviced by the system appears to be impossible. The static pressure in the header duct at each outlet will be different and will vary according to the demands of each room.

SUMMARY OF THE INVENTION

The principal object of the present invention is to provide compact apparatus for conditioning the air in enclosed zones or spaces, such as the rooms of a building. Another object of the present invention is to provide apparatus for discharging conditioned air into a room at a substantially constant velocity independently of variations of the volume flow rate and/or temperature of the conditioned air.

Still another object of the present invention is to provide air conditioning apparatus which uses a single stream of pre-conditioned air for conditioning the air in a building room requiring heating and/or cooling.

A further object of the present invention is to provide air conditioning apparatus incorporating heat exchanger means for altering the temperature of the single stream of conditioned air when required to maintain the room air at a selected temperature.

Another object of the present invention is to provide apparatus wherein the conditioned air may be discharged in any desired combination of a minimum volume flow rate and two maximum volume flow rates so as to obtain a volume flow rate combination best suited for the air conditioning requirements of any room which requires cooling and/or heating.

A still further object of the present invention is to provide compact air conditioning apparatus by which room air conditioning is accomplished through variations in the volume flow rate and/or temperature of a single stream of preconditioned air.

The present invention provides improvements in an air conditioning device of the type having (a) a single air inlet means connected with a single source of pre-conditioned air, (b) a single air outlet means communicating with a single room of a building, and (c) temperature sensing means within the room which is responsive to the instantaneous temperature within the room and adapted to generate a thermostat control impulse.

In accordance with the present invention, the air conditioning device is provided with air inlet valve means responsive to the instantaneous static pressure of air within the device for regulating the volume flow rate of air through the air inlet means thereby to maintain the static pressure at a substantially constant selected value and thereby to maintain the velocity of preconditioned air entering the room from the device substantially constant. Air outlet means responsive to the thermostat control impulse is provided for regulating the volume flow rate of air through the air outlet means thereby to maintain the temperature within the room substantially constant at a selected temperature. Transducer means operable on the air outlet valve means is provided for converting linear variations of the thermostat control impulse into non-linear variations of the air outlet valve means. Heat exchanger means disposed within the device between the air inlet valve means and the air outlet valve means and operable in response to the thermostatic control impulse is provided for altering the temperature of the preconditioned air between the air inlet opening and the air outlet opening in accordance with the instantaneous conditions in the room.

The overall arrangement of the present air conditioning device is such that the static pressure in the device is maintained substantially at a selected value whereby the velocity of conditioned air discharged through the air outlet means is maintained substantially constant independently of the volume flow rate and/or the temperature of the conditioned air discharged through the air outlet means. Furthermore, the present air conditioning device receives a single stream of preconditioned air and in response to thermostatic means situated in a room, regulates the volume flow rate and/or temperature within preconditioned air to maintain the temperature within the room substantially constant at a selected temperature.

Further in accordance with the present inventions, the air outlet valve means may comprise pivotal damper means which regulates the effective discharge area of the air outlet means. The aforesaid transducer means converts linear variations in the thermostat control impulse into non-linear angular displacements of the pivotal damper means whereby the volume flow rate of preconditioned air varies linearly with the thermostat control impulse.

BRIEF DESCRIPTION OF THE DRAWINGS

The above and other objects and advantages of the present invention will become apparent from the following detailed description by reference to the accompanying drawings, in which:

FIGURE 1 is a schematic illustration representing a typical building room having air inlet means, air outlet means and automatic air conditioning means of the present invention;

FIGURE 2 is a cross-sectional view taken along the line II—II of FIGURE 1, illustrating heat exchanger means;

FIGURE 3 is a cross-sectional illustration of thermostatic means;

FIGURE 11 is a graph illustrating the discharge volume flow rate of conditioned air and the flow rate of a heat exchange medium as functions of a typical thermostatic signal pressure;

FIGURE 12 is a side view of inlet valve means;

FIGURE 13 is a cross-sectional illustration of flow regulating means suitable for operating the inlet valve means of FIGURE 12.

FIGURE 14 is a cross-sectional illustration of regulating valve means suitable for controlling the flow of a heat exchange medium to the heat exchanger means of FIGURE 2; and FIGURE 15 is a schematic illustration representing a system in accordance with the present invention for individually conditioning the air in a plurality of rooms of a building.

DESCRIPTION OF THE PREFERRED EMBODIMENT(S)

Figure 4A:
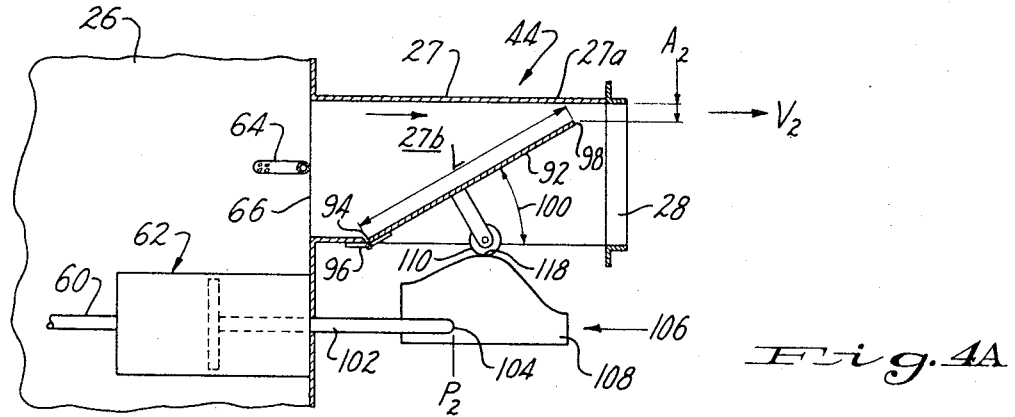
FIGURES 4A, 4B and 4C are cross-sectional views illustrating discharge valve means used in a present air conditioning apparatus and illustrating three flow controlling conditions thereof.

Referring to FIGURE 1 there is illustrated a typical building room 20 having boundaries 22 (indicated by the broken line). Air inlet means 24 enters the room 20 and into an enclosure 26 of an air conditioning device 25 of the present invention. The enclosure 26 has an air outlet means 27 including an outlet opening 28. The air inlet means 24 conveys conditioned air from a source of preconditioned air, schematically illustrated at 30, into the enclosure 26 for discharge through the outlet opening 28 into the room 20. Air outlet duct means 32 extends outwardly from the interior of the room 20 to permit withdrawal of air from the room 20.

The conditioned air conveyed from the source 30 to the room 20 may be relatively cool having a temperature in the range from about 50° F. to about 70° F. Alternatively, the conditioned air conveyed from the source 30 to the room 20 may be relatively hot having a temperature in the range from about 70° F. to 150° F. The present apparatus may employ either relatively cool air or relatively hot air. For the purposes of the present description, it will be assumed that the source 30 supplies relatively cold air.

Pneumatically-operated air inlet valve means 34 is connected with the air inlet means 24 for regulating the volume flow rate of conditioned air entering the enclosure 26.

Flow regulating means 36, mounted on the outside of the enclosure 26, provides a flow-regulating signal for operating the air inlet valve means 34 in response to the static pressure within the enclosure 26.

Heat exchanger means 38 is provided within the enclosure 26 for altering the temperature of the conditioned air admitted into the enclosure 26 in accordance with the demands of the instantaneous conditions in the room 20. Regulating valve means 40 controls the flow rate of a heat exchange medium into the heat exchanger means 38.

Pneumatically-operated thermostatic means 42 is provided within the room 20 for sensing the temperature therein and for generating a corresponding thermostat control impulse.

Discharge or air inlet valve means 44 is provided in the air outlet means 27 for regulating the volume flow rate of preconditioned air discharged from the device 25 through the outlet opening 28.

A pneumatic supply conduit 46 enters the room 20 and delivers a pneumatic impulse to the flow-regulating means 36 through a pneumatic conduit 48 and delivers a pneumatic impulse to the thermostatic means 42 through a pneumatic supply conduit 50. The flow regulating means 36 bleeds a portion of the pneumatic impulse from the pneumatic conduit 48 according to the instantaneous static pressure sensed within the enclosure 26 by the flow regulating means 36. The remaining pneumatic impulse is delivered as a flow-regulating signal through a flow-regulating signal conduit 52 to a pneumatic inlet valve operator 54. The air inlet valve means 34 has an orifice cross-sectional area which may be varied from zero to full-open in accordance with the flow-regulating impulse applied to the operator 54.

The thermostatic means 42 bleeds a portion of the pneumatic impulse from air temperature conduit 50 according to the instananeous air temperature in the room 20 as sensed by the thermostatic means 42. The remaining pneumatic impulse is delivered as a thermostatic signal through a thermostatic signal conduit 56 to a pneumatic valve operator 58 of the regulating valve means 40 and through a thermostatic signal conduit 60 to pneumatic drive means or operator 62 of the discharge valve means 44.

*Heat exchanger means 38*

Referring now to FIGURE 2, the heat exchanger means 38 may comprise a coil 70 of tubes having external fins 72 serving to increase the heat transfer area of the coil 70. The coil 70 is carried in a frame 74 which is mounted within the enclosure 26 such that the heat exchanger means 38 is positioned between the air inlet valve means 34 and the air outlet valve means 44. The coil 70 receives a heat exchange medium, which may comprise, for example, steam or hot water, through an inlet tube 76 which has the regulating valve means 40 connected therein. The heat exchange medium passes through the coil 70 whence heat is transferred to the conditioned air passing around the coil 70, to an outlet tube 78 which returns the cooled heat exchange medium to a heat source (not shown) for reheating and recirculation. It is important to note that the heat exchanger means 38 is so positioned within the enclosure 26 and suitably baffled that all of the conditioned air admitted into the enclosure 26 through the air inlet valve means 34 passes around the coil 70 in heat exchange relation therewith.

Thermostatic means 42

Referring now to FIGURE 3, the thermostatic means 42 may comprise a housing 80 having a bleed port 82 communicating with the atmosphere. A bleed conduit 84 communicates between the housing 80 and the pneumatic supply conduit 50. The pneumatic supply conduit 50 is provided with a bore-restriction 86 and communicates with the thermostatic signal conduit 56. The thermostatic means 42 has a nozzle 88 which confronts a bimetallic strip 90 constituting a flapper to obstruct the flow of air through the nozzle 88. The bimetallic strip adopts a position along a curvilinear locus according to the existing temperature and accordingly allows more or less of the pneumatic supply air to bleed through the nozzle 88 according to the existing temperature. The residual pressure in the conduit 56 thus depends upon the temperature sensed by the thermostatic means 42 and constitutes the thermostatic signal delivered to the regulating valve means 40 and the pneumatic drive means operator 62.

Air outlet valve means 44

Figure 4B:
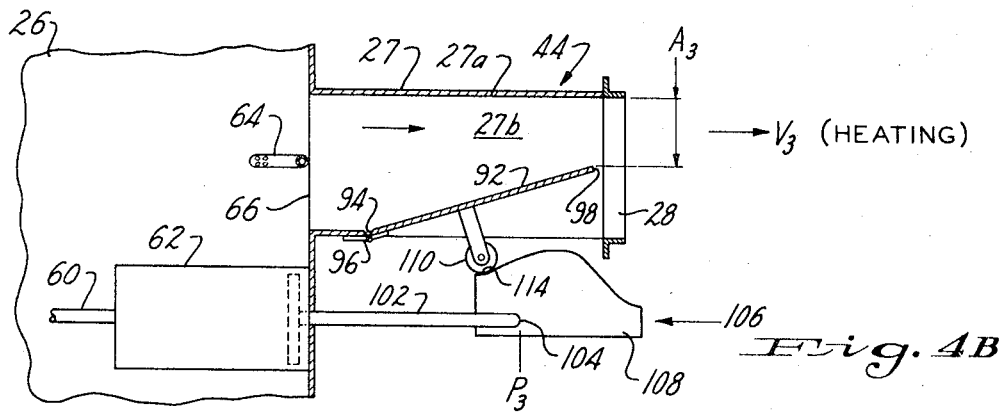
Figure 4C:
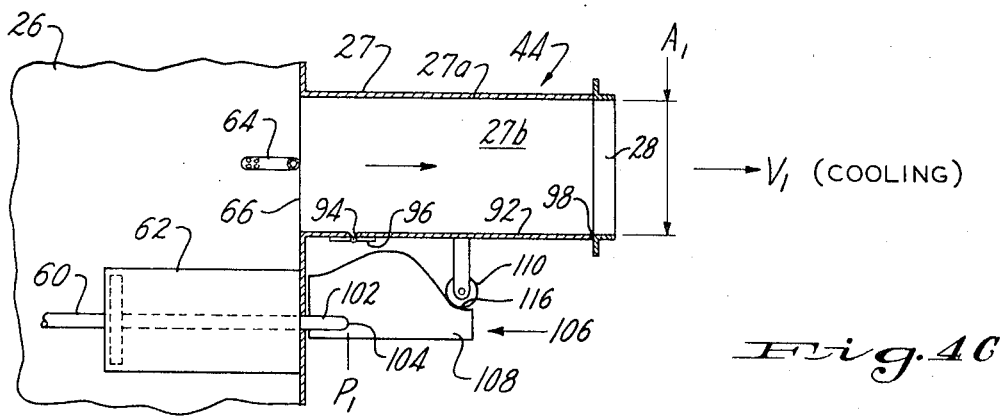

Reference is now directed to FIGURES 4A, 4B and 4C wherein three flow controlling conditions of the air outlet valve means 44 are illustrated. In general, the air outlet valve means 44 includes a pivotal damper means 92 having a leading edge 94 pivotally connected to the air outlet means 27 by hinge means 96 and a trailing edge 98 adjacent to the outlet opening 28. The air outlet means 27 comprises a top wall 27a and sidewalls 27b (only one visible). The damper means 92 preferably extends between the sidewalls 27b and constitutes a movable wall thereof. The damper means 92 is pivotal through an angle indicated at 100 in FIGURE 4A. In one embodiment of the present apparatus, the angle 100 is equal to 30 degrees. Thus, the damper means 92 is pivotal between one extreme position wherein it is inclined across the flow path of the conditioned air flowing through the air outlet means 27, as illustrated in FIGURE 4A, and a second extreme position wherein the damper means 92 is substantially parallel with the flow path of conditioned air passing through the air outlet means 27, as illustrated in FIGURE 4C. Additionally, the damper means 92 is positionable at an intermediate inclined position such as shown in FIGURE 4B.

In the first extreme position (FIGURE 4A), the trailing edge 98 of the damper means 92 reduces the effective discharge area of the outlet opening 28 to a value indicated at $A_2$ such that conditioned air is discharged at a minimum volume flow rate indicated by the designation $V_2$. In the intermediate position shown in FIGURE 4B, the trailing edge 98 establishes the effective discharge area of the opening 28 at a value indicated at $A_3$ and such that conditioned air is discharged at an intermediate volume flow rate designated by $V_3$. Finally, in the second extreme position of FIGURE 4C, the damper means 92 is substantially parallel with the flow path of the conditioned air such that the entire effective discharge area of the opening 28, indicated at $A_1$, is available for discharging a maximum volume flow rate of conditioned air which has been designated at $V_1$. The significance of these three positions and their corresponding volume flow rates will become apparent later in the specification.

The pneumatic drive means 62 constitutes an air motor having a piston rod or element 102. The drive means 62 reciprocates the piston rod 102 along a linear path substantially coincident with the longitudinal axis of the piston rod 102. The drive means 62 is responsive to and is operated by the thermostatic signal conveyed thereto through the thermostatic signal conduit 60. Employing the end 104 of the piston rod 102 as a reference point, it will be seen by comparing FIGURES 4B and 4C that the end 104 is reciprocable between a retracted position indicated at $P_1$ in FIGURE 4C and a fully extended position indicated at $P_3$ in FIGURE 4B. In FIGURE 4A, the end 104 is disposed at an intermediate point in the stroke of the rod 102, indicated by $P_2$. Whether the end 104 is at position $P_1$, $P_2$, or $P_3$, of course, depends on the pressure level of the thermostatic signal applied to the drive means 62.

The air outlet valve means 44 additionally includes transducer means for converting the linear variations of the thermostatic signal into non-linear variations of the air outlet valve means 44. The transducer means comprises cam means 106 connected to the rod 102 and engaged with the pivotal damper means 92 for pivoting the pivotal damper means 92 through non-linear angular displacements with linear displacement of the rod 102. The arrangement is such that the volume flow rate of conditioned air discharged through the outlet opening 28 varies linearly with the displacement of the rod 102. The cam means 106 may comprise a cam member 108 carried by the rod 102 and a cam follower 110 carried by the pivotal damper means 92.

Figure 5:
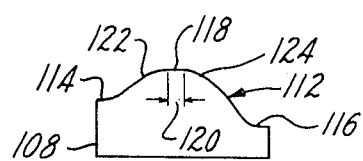
FIGURE 5 is a side view of a cam member, employed in the discharge valve means of FIGURES 4A, 4B and 4C.

Referring now to FIGURE 5, the cam member 108 has a cam surface 112 of predetermined profile including a first end plateau 114, a second end plateau 116, and an intermediate plateau 118. The intermediate plateau 118 is actually a flat having a width indicated at 120, such that the predetermined minimum volume flow rate $V_2$ of conditioned air will be discharged from the apparatus even though the instantaneous room air temperature varies over a relatively narrow temperature range from the selected temperature. The narrow temperature range may comprise, for example 0.5° F. above and below the selected temperature for the room being conditioned.

Figure 6:
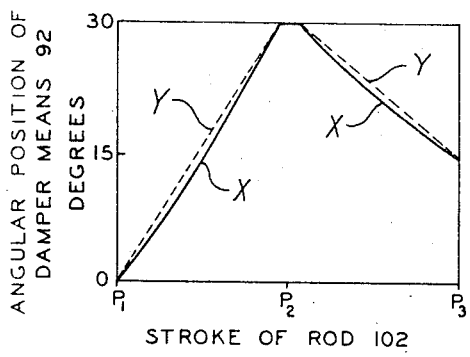
FIGURE 6 is a graph illustrating the non-linear variation in the angular position of the damper as a function of rod stroke.
Figure 7:
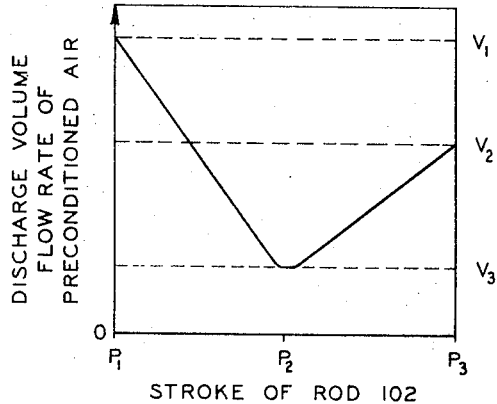
FIGURE 7 is a graph illustrating the linear variation in the discharge volume flow rate of conditioned air as a function of rod stroke.

The cam surface 112 includes a first curved segment 122 extending between the first end plateau 114 and the intermediate plateau 118, and a second curved segment 124 extending between the intermediate plateau 118 and the second end plateau 116. The curvature of the first and second curved segments 122, 124 is such that, as shown in FIGURE 6, the angular displacement of the damper means (curve X) 92 varies non-linearly with the stroke or linear displacement of the rod 102. The dotted line Y is straight and has been added solely for the purpose illustrating the curvature of the curve X. The non-linear variation of the angular position of the damper means 92 is such that the volume flow rate of conditioned air discharged from the air outlet means 27 varies linearly with the stroke of the rod 102, as shown in FIGURE 7.

This is contrary to the operation of conventional flow regulating dampers wherein the angular movement of the damper is proportional to piston stroke while the variation in volume discharge is a non-linear function of the piston stroke.

Another important feature of the cam means 106 is that the relative position of the first and second end plateaus 114, 116, relative to the intermediate plateau 118 is such that when the cam follower 110 engages the first end plateau 114, an intermediate volume flow rate $V_3$ of conditioned air is discharged from the air outlet means 27 whereas when the cam follower 110 is engaged with the second end plateau 116, a larger volume flow rate $V_1$ of conditioned air is discharged from the air outlet means 27. It is a known principle of air conditioning that a larger volume flow rate of air is required for cooling a space than is required for heating the same space. Thus, the present apparatus is capable of providing a large volume flow rate $V_1$ for cooling the selected room and a smaller volume flow rate $V_3$ for heating the same room. The minimum volume flow rate $V_2$ is discharged into that room when the room air temperature is at the selected temperature. The "condition" (that is temperature) of the conditioned air discharged at the minimum volume flow rate $V_2$ compensates for normal heat gains or heat losses in the room.

The amount of heat loss or heat gain varies with room size, amount of insulation, thermal loads such as lights and motors, and the like. The minimum volume flow rate $V_2$ of conditioned air discharged through the opening 28 is proportional to the effective discharge area $A_2$ which is determined by the spacing between the trailing edge 98 of the damper means 92 and an upper wall 27a (FIGURE 4A) and the first end plateau 114, for example. The minimum volume flow rate $V_2$ is most conveniently adjusted to suit requirements by changing the length L (FIGURE 4A) of the damper means 92.

Alternatively, the minimum volume flow rate $V_2$ may be adjusted to suit requirements by adjusting the vertical spacing between the intermediate plateau 118 (FIGURE 5) and the first end plateau 114, for example.

The overall arrangement is such that any desired combination of minimum volume flow rate $V_2$ and maximum volume flow rates $V_1$ and $V_3$ can be conveniently obtained to arrive at a combination best suited for the requirements of conditioning the air in any room requiring heating and/or cooling.

Figure 8:
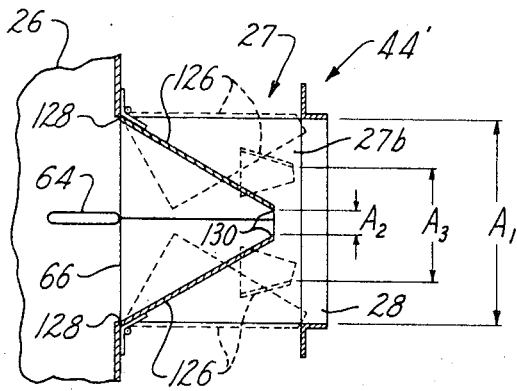
FIGURES 8 and 9 are cross-sectional views illustrating an alternative embodiment of the present discharge valve means.
Figure 9:
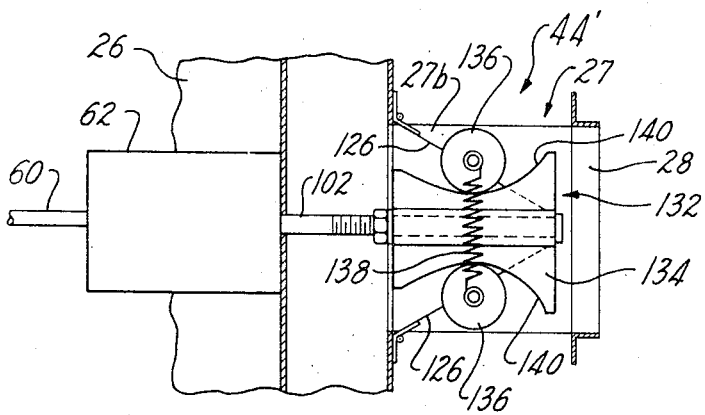

Reference is now directed to FIGURES 8 and 9 wherein there is illustrated an alternative embodiment of air outlet valve means 44'. Corresponding numerals will be employed to identify corresponding parts heretofore described.

The air outlet valve means 44' includes a pair of damper means 126 having corresponding leading ends 128 hinged to the enclosure 26 and corresponding opposite trailing ends 130 whose spacing determines the area for discharging conditioned air through the outlet opening 28. As can best be seen in FIGURE 8, the damper means 126 are pivotal about their corresponding leading ends 128 between that position shown in full lines wherein the effective discharge area of the outlet opening 28 is reduced to the value indicated at $A_2$, and second extreme positions shown in dotted outline wherein the corresponding opposite trailing ends 130 are spaced apart such that the entire effective discharge area indicated by $A_1$ is available for passing conditioned air from the air outlet means 27 of which only the sidewalls 27b are required. The damper means 126 are also positionable at an intermediate position also shown in dotted outline wherein the effective discharge area of the outlet opening 28 is reduced to a value indicated at $A_3$. The three different effective discharge areas $A_1$, $A_2$ and $A_3$ establish the volume flow rates $V_1$, $V_2$ and $V_3$ as described above.

The drive means 62 operates transducer or cam means 132 which include a cam member 134 carried by the rod 102 and cam followers 136, one carried by each of the damper means 126. A spring member 138 has its opposite ends connected to the cam followers 136 for urging the same toward one another.

The cam member 134 having bilateral symmetry presents two cam surfaces 140 of identical profile. Each of the cam surfaces 140 is engaged by one of the cam followers 136.

Figure 10:
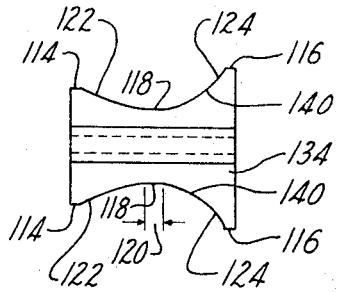
FIGURE 10 is a side view of a cam member employed in the valve means of FIGURES 8 and 9.

Referring now to FIGURE 10, the cam surfaces 140 are similar to the cam surface 112 of the cam member 108 (FIGURE 5) but differ therefrom in that the cam surfaces 112 are concave whereas the cam surfaces 140 are outwardly convex. The cam surfaces 140 include first and second end plateaus 114, 116 and an intermediate plateau 118. The intermediate plateau 118 comprises a flat having a width indicated at 120. In addition, each of the cam surfaces 140 includes the first and second curved segments 122, 124. The curvature of the first and second curve segments 122, 124 is such that the volume flow rate of conditioned air discharged through the outlet opening 28 of the discharge valve means 44' varies linearly with the stroke of the rod 102, as explained above. The valve means 44' operates in a manner similar to the valve means 44 and has all of the desirable features thereof.

Heating and cooling operation

Reference is now directed to FIGURE 11 which is a graphical illustration of the discharge volume flow rate of conditioned air and the flow rate of heat exchange medium as a function of the thermostatic signal pressure.

As explained above, the stroke or position of the piston 102 depends on the pressure of the thermostatic signal. In a typical situation, the thermostatic signal pressure may vary typically over a range of about 8 to 13 p.s.i.g., as indicated in FIGURE 11. The thermostatic signal pressure levels of 8, 10.5 and 13 p.s.i.g. correspond to the previously described positions $P_1$, $P_2$ and $P_3$ of the rod 102.

When the room air temperature is at the selected temperature, the thermostatic signal pressure will be 10.5 p.s.i.g. Because of the width of the intermediate plateau 118 of the cam member 108 (134), the room air temperature may vary over a selected narrow operating range without causing any corresponding change in the volume flow rate of conditioned air discharged from the apparatus. The upper and lower limits of this selected narrow operating range are indicated in FIGURE 11 by the dash-dot lines 142, 144. Thus, when the thermostatic signal pressure is within the limits of the selected narrow operating range, the volume flow rate of conditioned air discharged from the apparatus will remain substantially constant at the minimum volume flow rate $V_2$.

In the hot room circumstance where the room air temperature exceeds the selected room temperature, the thermostatic signal pressure will decrease and approach 8 p.s.i.g. During the decrease in thermostatic signal pressure, the volume flow rate of conditioned air discharged from the apparatus increases along the linear cooling curve 146 toward a maximum volume flow rate of $V_1$. The increased volume flow rate of conditioned air lowers the room air temperature toward the selected room temperature. As the room air cools, the volume flow rate of conditioned air discharged from the apparatus will also decrease along the linear cooling curve 146 until the room air temperature again equals the selected room temperature whereupon a minimum volume flow rate $V_2$ of conditioned air will be discharged from the apparatus. The minimum volume flow rate $V_2$ will remain so long as the room air remains at the selected temperature.

In the cold room circumstance, the thermostatic signal will increase and approach a value of 13 p.s.i.g. During this increase in thermostatic signal pressure, the volume flow rate of conditioned air discharged from the apparatus will increase along the linear heating curve 148 and approach a maximum volume flow rate $V_3$. However, as soon as the thermostatic signal pressure passes the upper limit 142, the thermostatic signal actuates the regulating valve means 40 of the heat exchanger means 38 such that heat exchange medium is introduced into the heat exchanger means. The flow rate of the heat exchange medium will increase along a heating medium curve indicated in FIGURE 11 by the dash-dot line 150. Thus, as the volume flow rate of conditioned air increases along the linear heating curve 148, the flow rate of heat exchange medium also increases with the result that heated conditioned air is discharged from the apparatus to effect a heating of the room air temperature. As the room air temperature increases and approaches the selected room temperature, the volume flow rate of conditioned air decreases along the linear heating curve 148 while the flow rate of heat exchange medium also decreases along the heating medium curve 150. When the room air temperature is restored to the selected room temperature, the heat exchanger 38 no longer receives heat exchange medium and a minimum volume flow rate $V_2$ of conditioned air will be discharged from the apparatus.

Inlet valve means 34

The inlet valve means 34 may comprise any one of many conventional pneumatically operated valves. The inlet valve means 34 preferably comprises that valve means described and illustrated in copending application Ser. No. 433,613, filed Feb. 18, 1965, and assigned to the assignee of the present invention. For a complete description of the construction and operation of that valve means, reference is directed to the aforesaid copending application Ser. No. 433,613. However, for the purposes of the present invention, it is believed sufficient to state that with reference to FIGURE 12, the inlet valve means 34 comprises a plug 152 carried at the end of a piston rod 154 projecting from the pneumatic valve operator 54 which comprises an air motor operable by the flow-regulating signal received through the flow-regulating signal conduit 52. The plug 152 is displaceable by the valve operator 54 toward and away from engagement with an annular sealing gasket 156 carried on a rim 158 of a two-piece duct segment 160. The duct segment 160 has an annular flange 162 adapting the duct segment 160 for securement to the enclosure 26 in communicating relation the air-carrying duct means 24.

As should be apparent, the cross-sectional area of the opening 164 defined by the annular gasket 156 is zero when the plug 152 is engaged with the gasket 156; and is full-open when the plug 152 is in the position illustrated in FIGURE 12. Intermediate positions of the plug 152 vary the cross-sectional area of the opening 164, thereby regulating the volume flow rate of conditioned air discharged into the enclosure 26.

Flow-regulating means 36

Referring now to FIGURE 1, the flow-regulating means 36 employs a sensing tip 64 for sensing the static pressure at a point in the enclosure 26, the point preferably being at the entrance 66 to the discharge duct means 27. The sensing tip 64 is carried by a static pressure impulse conduit 68 which conveys the static pressure impulse to the flow regulating means 36.

The flow regulating means 36 may comprise any suitable flow regulating device which is adjustable and operable to generate a flow regulating signal corresponding to the instantaneous static pressure at the entrance 66. A flow regulating device suitable for use in the present apparatus is sold by the Johnson Service Company of Milwaukee, Wis., and identified as the R–317 Flow Regulator.

Referring now to FIGURE 13, the flow-regulating means 36 may comprise a housing 166 whose interior is divided into chambers 168, 170 by a diaphragm 172. The static pressure impulse conduit 68 communicates with the chamber 168 and introduces therein the static pressure sensed by the sensing tip 64. The housing 166 includes a bleed port 174 communicating the chamber 170 with the atmosphere.

The static pressure introduced into the chamber 168 operates against the diaphragm 172 in opposition to a spring 176 which has one of its ends connected to the diaphragm 172 and its opposite end connected to an adjustment screw 178. As is conventional, the adjustment screw 178 increases or decreases the tension applied by the spring 176 to the diaphragm 172 thereby setting the flow-regulating control means 36 at the selected static pressure which is desired at the inlet 66 of the discharge duct means 27.

Also within the housing 166 is a second diaphragm 180 having a surface area which is relatively small compared to the surface area of the diaphragm 172 and which further subdivides the interior of the housing 162 into a third chamber 182 communicating with the atmosphere through a bleed port 184. A rod 186 connects the diaphragms 172, 180 for unitary movement. A resilient pad 188 is provided on the underside of the diaphragm 180 and is positioned thereon in opposition to an inlet bleed port 190 communicating with the pneumatic supply conduit 48. A bore-restriction 192 is provided in the pneumatic supply conduit 48 upstream of the flow-regulating signal conduit 52.

In operation, the flow-regulating means 36 receives a static pressure impulse through the static pressure impulse conduit 68 which positions the diaphragms 172, 180 in accordance with the sensed static pressure. In addition, the flow-regulating means 36 receives a pneumatic impulse through the pneumatic supply conduit 48 and bleeds that impulse in accordance with the difference between the instantaneous static pressure measured by the sensing tip 64 and the selected static pressure for the entrance 66. The residual pneumatic pressure is delivered as a flow-regulating signal through the flow-regulating signal conduit 52 to the pneumatic valve operator 54 of the inlet valve means 34. The flow-regulating signal corresponds to the difference between (a) the static pressure measured at the entrance 66, and (b) the selected static pressure for the entrance 66.

Should the instantaneous static pressure at the entrance 66 be greater than the selected static pressure, the resilient pad 188 is moved toward the inlet bleed port 190 reducing the amount of the pneumatic impulse bled from the supply conduit 48 and increasing the pressure level of the flow-regulating signal causing the inlet valve means 34 to be throttled and to decrease the volume flow rate of conditioned air admitted into the enclosure 26.

If, on the other hand, the instantaneous static pressure at the entrance 66 is less than the selected static pressure, the pad 188 is moved away from the inlet bleed port 190 increasing the amount of the pneumatic impulse bled from the supply conduit 48 and decreasing the pressure level of the flow-regulating signal causing the inlet valve means 34 to open and admit a greater volume flow rate of conditioned air into the enclosure 26. The overall arrangement is such that any change in the instantaneous static pressure at the entrance 66 will be accompanied by an inverse change in the volume flow rate of conditioned air admitted into the enclosure 26, to restore the instantaneous static pressure at the entrance 66 to the selected static pressure value.

Regulating valve means 40

The regulating valve means 40 may comprise any suitable pneumatically operated valve. A typical valve is shown in FIGURE 14 wherein it can be seen that the valve means 40 may include a plug 194 carried by a valve stem 196 for reciprocation toward and away from engagement with a valve seat 198. The heat exchange medium flows from the inlet tube 76 through the valve seat 198 to an outlet opening 200 communicating with the coil 70. The position of the plug 194 relative to the valve seat 198 determines the flow rate of heat exchange medium through the regulating valve means 40.

The valve stem 196 extends through a packing gland 202 and terminates in an annular member 204. A spring 206 urges the valve stem 196 and hence the plug 194 into engagement with the valve seat 198. The regulating valve means 40 is thus a normally closed valve. The regulating valve means 40 includes an upper housing 208 having an operator diaphragm 210 positioned therein to define a valve operating chamber 212 which receives the pneumatic thermostatic signal through the thermostatic signal conduit 56.

Increased pressures within the valve operating chamber 212 cause the valve stem 196 and the valve plug 194 to move against the spring 206 and open the valve means 40 to permit flow of heat exchange medium from the inlet tube 76 to the coil 70. The spring 206 provides a threshold pressure which must be exceeded by the thermostat impulse signal before the valve means opens. After the thermostat impulse signal exceeds the threshold pressure, the opening of the valve means 40 increases jointly with continuing increases of the thermostat impulse signal applied to the chamber 212.

Reference is now directed to FIGURE 15 wherein there is schematically illustrated a floor 214 of a building 216. The floor 214 includes a group of rooms 218 having windows 220 and group of rooms 222. A corridor 224 separates the rooms 218, 222. Each of the rooms 218, 222 includes the outlet duct 32 and the device 25 of the present invention. Also illustrated is a central air conditioning unit 226 which, as is conventional, may be situated on the roof of the building. The central air-conditioning unit 226 includes air inlet louvers 228 operated by motor 230. A main header duct 232 extends from the central air conditioning unit 226 to the floor 214 of the building 216 through the corridor 224. Branch ducts 234 extend from the main header duct 232 to each air conditioning apparatus 26.

As is conventional, a static pressure sensor 236 is provided adjacent the outlet of the central air conditioning unit 226 for sensing the static pressure at that point. The static pressure impulse is conveyed to a static pressure control device 238 which, in turn, transmits a control signal to the motor 230 for positioning the air inlet louvers 228. Alternatively, the control signal may be transmitted directly to the fan motor housed within the unit 226. The static pressure control device 238 and the sensor 236 are operative to maintain a selected static pressure at the entrance to the main header 232. The elements 226 to 238 inclusive are well known in the prior art.

Each device 25 includes air inlet and air outlet valve means 34, 44, the flow regulating means 36, the heat exchanger means 38 with its regulating valve means 40. A thermostatic means 42 is provided in each of the rooms 218, 222 for sensing the room air temperature therein to produce a thermostatic signal which is transmitted to the discharge valve means 44 and the regulating valve means 40. The operation of each device 25 is identical to that described above.

Thus, each of the rooms 218, 222 receives conditioned air which is discharged from the device 25 at a constant velocity and whose volume flow rate and/or the temperature is controlled by the thermostatic means 42, the air outlet valve means 44 and the heat exchanger means 38.

In operation, the central air conditioning unit 226 discharges a stream of conditioned air into the main header duct 232. As stated above, for the purposes of the present explanation it will be assumed that the conditioned air is at a temperature in the range of from 50 to 70 degrees F. The single stream of conditioned air is conveyed to each device 25 through a branch duct 234. The static pressure at the entrance of each branch duct 234 will be different. The static pressure of the branch duct 234A, closest to the central air conditioning unit 234, will normally be greater than the static pressure at the entrance of the branch duct 234B which is farthest removed from the central air conditioning unit 226. The static pressures at the entrances of the branch ducts 234 intermediate of the two end branch ducts 234A, 234B will, of course, be at levels intermediate of these extreme static pressures. However, the control provided by the interaction of the air inlet valve means 34 and the flow regulating means 36, is such that the static pressure at the entrance of all air outlet valve means 44 of each device 25 will be substantially the same.

The windows 220 of the rooms 218 represent a relatively large heat transmission area through which the rooms 218 may gain or lose heat with changes of the seasons. The rooms 218 have a cooling/heating demand which may vary over a relatively large range.

The rooms 222, on the other hand, may be virtue of their location in the building 216 have a cooling/heating demand which is different from the cooling/heating demand of the rooms 218.

In accordance with the present invention, the air in the rooms 218, 222 is conditioned by the single stream of preconditioned air conveyed to the individual devices 25 by the main header duct 232 from the central air conditioning unit 226. In each individual room 218 or 222, the interaction of the air inlet valve means 34 and the flow regulating means 36 maintains the static pressure within the device 25 substantially constant whereby the velocity of the preconditioned air discharged into that room is maintained at a substantially constant value. The air outlet valve means in response to the thermostatic means 42 regulates the volume flow rate of conditioned air entering that room whereby a selected air temperature is maintained for that room. The heat exchanger means 38 alters the temperature of the preconditioned air flowing between the air inlet valve means 34 and the air outlet valve means 44 in response to instantaneous room conditions sensed by the thermostat means 42. The heat exchanger means 38 and the air outlet valve means 44 cooperate to maintain the room air temperature substantially at a selected air temperature.

The overall arrangement is such that the velocity of preconditioned air discharged into a particular room 218, for example, is maintained substantially constant independently of the volume flow rate and/or temperature of preconditioned air flowing into that particular room and independently of the volume flow rate and/or temperature of preconditioned air flowing into all other rooms.

As should be evident, the present device 25 permits the discharge velocity as well as the range of volume flow rates and/or temperature of preconditioned air discharged into the room to be varied or set in accordance with the size of the room. For example, a relatively small room requires a lesser volume flow rate range for heating and cooling the same as well as a relatively low discharge velocity for throwing or propelling the conditioned air across the small room to create desirable circulation patterns within the room. On the other hand, a relatively larger room requires a larger volume flow rate range for heating and cooling and a relatively higher discharge velocity for throwing or propelling the conditioned air across the room to create desirable circulation patterns within that room.

Control considerations

The present air conditioning device, as described above, is provided with pneumatically operated control devices. It should be evident, however, that the pneumatically operated control devices may be replaced by electrically or hydraulically operated devices to achieve all of the desirable features of the present invention.

Furthermore, the thermostatic means 42 as described above is a reverse acting thermostat wherein the thermostatic control impulse pressure level varies inversely as the temperature. The reverse acting thermostatic means 42 may be replaced by direct acting thermostatic means wherein the thermostatic impulse signal pressure level varies directly as the temperature. Appropriate changes in the regulating valve means 40 and the profile of the cam members 108, 134 must be made when the reverse acting thermostatic means 42 is replaced by direct acting thermostatic means. In addition, the flow regulating means 36 as described above is direct acting in that the flow regulating signal pressure level varies directly as the instantaneous static pressure within the enclosure 26. The direct acting flow regulating means 36 may be replaced by reverse acting flow regulating means with an appropriate change in the operation of the inlet valve means 44.

With respect to the heat exchanger means 38, it may be desirable in some air conditioning situations to have the heat exchanger medium flow continuously through the coil 70 at some minimum flow rate so as to maintain the conditioned air at a selected temperature.

What is claimed is:

1. In an air conditioning device having (a) a single air inlet means connected with a single source of preconditioned air, (b) a single air outlet means communicating with a single room of a building, and (c) temperature sensing means within said room which is responsive to the instantaneous temperature within said room and adapted to generate a thermostat control impulse, the improvement comprising:

air inlet valve means responsive to the instantaneous static pressure of air within said device for regulating the volume flow rate of air through said air inlet means thereby to maintain said static pressure at a substantially constant selected value;

whereby the velocity of said air entering said room from said device is substantially constant;

air outlet valve means responsive to said thermostat control impulse for regulating the volume flow rate of air through said air outlet means thereby to maintain the temperature within said room at a substantially constant selected temperature; and heat exchanger means disposed within said device between said air inlet valve means and said air outlet valve means and operable in response to the said thermostat control impulse for altering the temperature of said preconditioned air between said air inlet opening and said air outlet opening in accordance with the instantaneous conditions in said room.

2. The improvement defined in claim 1 wherein said heat exchanger means is positioned within said device such that all of said preconditioned air admitted into said device passes through said heat exchanger means in heat exchange relation therewith.

3. The improvement defined in claim 1 wherein heat exchanger means includes:

inlet conduit means connected with a single source of heat exchange medium; and heat exchange medium inlet valve means responsive to the said thermostat control impulse for regulating the flow rate of heat exchange medium through said heat exchange medium inlet valve means;

said heat exchanger means being activated only when the room air temperature falls below said selected temperature.

4. The improvement defined in claim 1 including transducer means operable on said air outlet valve means for converting linear variation of the said thermostat control impulse into non-linear variation of said air outlet valve means.

5. The improvement defined in claim 4 wherein:

said air outlet valve means comprises pivotal damper means for regulating the effective discharge area of said air outlet means; and said transducer means comprises an element, drive means responsive to said thermostat control impulse for displacing said element along a linear path in accordance with linear variations of said thermostat control impulse; and cam means driven by said element for pivoting said damper means through non-linear angular displacements with the linear displacement of said element;

whereby the effective discharge area and the volume flow rate of air through said air outlet means vary linearly with the linear displacement of said element.

6. In an air conditioning device having (a) a single air inlet means connected with a single source of preconditioned air, (b) a single air outlet means communicating with a single room of a building, and (c) temperature sensing means within said room which is responsive to the instantaneous temperature within said room and adapted to generate a thermostat control impulse, the improvement comprising:

air outlet valve means responsive to the said thermostat control impulse for regulating the volume flow rate of air through said air outlet means thereby to maintain the temperature within said room at a substantially constant selected value, transducer means operable on said air outlet valve means for converting linear variation of the said thermostat control impulse into non-linear variations of said air outlet valve means, said air outlet valve means comprises pivotal damper means for regulating the effective discharge area of said air outlet means;

said transducer means comprises an element, drive means responsive to said thermostat control impulse for displacing said element along a linear path in accordance with linear variations of said thermostat control impulse; and cam means driven by said element for pivoting said damper means through non-linear angular displacements with the linear displacement of said element;

whereby the effective discharge area and the volume flow rate of air through said air outlet means vary linearly with the linear displacement of said element, said cam means is positionable in accordance with values of said thermostat control impulse (a) at a first extreme position, (b) at an intermediate position, and (c) at a second extreme position which is remote from said first extreme position;

said cam means being at said intermediate position when the air temperature in said room is substantially equal to said selected temperature;

said cam means pivoting said damper means such that the volume flow rate of air through said outlet air means varies linearly from a minimum volume to a first maximum volume when said element is moved from said intermediate position to said first extreme position, and the volume flow rate of air through said air outlet means varies linearly from said minimum volume to a second maximum volume when said element is moved from said intermediate position to said extreme position, heat exchanger means disposed within said device in advance of said air outlet valve means and operable in response to said thermostat control impulse for altering the temperature of said preconditioned air prior to discharge through said air outlet opening in accordance with the instantaneous conditions in said room;

said heat exchanger means being activated by said thermostat control impulse when the instantaneous temperature in said room falls below said selected temperature and is inactive when the instantaneous temperature in said room is above said selected temperature, whereby said preconditioned air is discharged from said device at an altered temperature at one said maximum volume.

No references cited.

ROBERT A. O'LEARY, *Primary Examiner.*

CHARLES SUKALO, *Assistant Examiner.*

U.S. Cl. X.R.

98—38; 165—22, 40, 50, 96